United States Patent
DeRose

(10) Patent No.: US 8,474,215 B2
(45) Date of Patent: Jul. 2, 2013

(54) LOW-COST REDEPLOYABLE PROTECTIVE SHELTER

(75) Inventor: Dirk DeRose, Tulsa, OK (US)

(73) Assignee: Dirk DeRose, Tulsa, OK (US)

( * ) Notice: Subject to any disclaimer, the term of this patent is extended or adjusted under 35 U.S.C. 154(b) by 0 days.

(21) Appl. No.: 13/600,622

(22) Filed: Aug. 31, 2012

(65) Prior Publication Data

US 2012/0324824 A1   Dec. 27, 2012

Related U.S. Application Data

(63) Continuation of application No. 12/696,810, filed on Jan. 29, 2010, now abandoned.

(60) Provisional application No. 61/148,688, filed on Jan. 30, 2009.

(51) Int. Cl.
  *E04B 1/00* (2006.01)

(52) U.S. Cl.
  USPC .......................... 52/745.19; 52/79.1

(58) Field of Classification Search
  USPC ............... 52/745.15, 79.1, 169.6, 19, 745.12, 52/741.15, 745.19, 745.2
  See application file for complete search history.

(56) References Cited

U.S. PATENT DOCUMENTS

| | | | | | |
|---|---|---|---|---|---|
| 288,354 | A | * | 11/1883 | Mileham | 52/169.6 |
| 1,577,475 | A | * | 3/1926 | Liska | 114/350 |
| 2,629,348 | A | * | 2/1953 | Kifferstein | 109/58 |
| 2,871,802 | A | * | 2/1959 | Fishler | 109/1 S |
| 2,955,549 | A | * | 10/1960 | Frankfort | 109/1 S |
| 2,968,130 | A | * | 1/1961 | Bascom | 52/206 |
| 3,118,401 | A | * | 1/1964 | Platt | 109/1 S |
| 3,138,124 | A | * | 6/1964 | Baier | 109/1 S |
| 3,159,117 | A | * | 12/1964 | Rosenfeld | 109/1 S |
| 4,336,674 | A | * | 6/1982 | Weber | 52/169.6 |
| 4,534,144 | A | * | 8/1985 | Gustafsson et al. | 52/169.6 |
| 4,805,360 | A | * | 2/1989 | Kuehnl | 52/169.1 |
| 4,955,166 | A | * | 9/1990 | Qualline et al. | 52/169.6 |
| 5,115,613 | A | * | 5/1992 | McCarthy | 52/169.6 |
| 5,426,900 | A | * | 6/1995 | Springer | 52/79.1 |
| 5,429,851 | A | * | 7/1995 | Sallee | 428/71 |
| 5,671,568 | A | * | 9/1997 | Armanno, Sr. | 52/66 |
| 5,749,181 | A | * | 5/1998 | Bauman | 52/169.6 |

(Continued)

OTHER PUBLICATIONS

Derose, Dirk, "Low-Cost Redeployable Protective Shelter", U.S. Appl. No. 12/696,810, filed Jan. 29, 2012, Non Final Office Action dated May 2, 2012.

(Continued)

*Primary Examiner* — William Gilbert
*Assistant Examiner* — James Ference
(74) *Attorney, Agent, or Firm* — Brian F. Russell; Yudell Isidore Ng Russell PLLC

(57) ABSTRACT

A protective shelter is presented. The protective shelter includes a substantially cylindrical wall member defining a shelter interior. The wall member has a first end and a second end and an opening formed there through. A domed member is coupled to the first end of the wall member. A door coupled to the wall member. The door is openable to permit ingress and egress into and out of the shelter interior through the opening and being closeable to cover the opening. At least one anchor point is coupled to the wall member adjacent to the second end, such that the protective shelter can be anchored to an underlying substrate.

21 Claims, 8 Drawing Sheets

U.S. PATENT DOCUMENTS

| | | | | |
|---|---|---|---|---|
| 5,813,174 | A * | 9/1998 | Waller | 52/79.1 |
| 5,875,535 | A * | 3/1999 | Canoy | 29/275 |
| 5,896,607 | A * | 4/1999 | Hagen | 7/166 |
| 5,921,043 | A * | 7/1999 | McDonald | 52/309.9 |
| 5,930,961 | A * | 8/1999 | Beaudet | 52/169.6 |
| 5,956,907 | A * | 9/1999 | Martin | 52/169.1 |
| 6,085,475 | A * | 7/2000 | Parks et al. | 52/169.6 |
| 6,131,343 | A * | 10/2000 | Jackson, Jr. | 52/86 |
| 6,260,312 | B1 * | 7/2001 | Spene et al. | 52/169.6 |
| 6,263,637 | B1 * | 7/2001 | Spene et al. | 52/745.02 |
| 6,266,863 | B1 * | 7/2001 | Spene et al. | 29/416 |
| 6,351,881 | B1 * | 3/2002 | Peckich et al. | 29/275 |
| 6,385,920 | B1 * | 5/2002 | Chandler | 52/169.6 |
| 6,393,776 | B1 * | 5/2002 | Waller et al. | 52/169.6 |
| 6,438,906 | B1 * | 8/2002 | Komarowski et al. | 52/169.1 |
| 6,481,166 | B2 * | 11/2002 | Shelton | 52/167.1 |
| 6,679,009 | B2 * | 1/2004 | Hotes | 52/86 |
| 6,948,281 | B1 * | 9/2005 | Carmichael | 52/86 |
| 7,143,491 | B2 * | 12/2006 | Wood | 29/275 |
| 7,690,159 | B1 * | 4/2010 | Arnold | 52/167.1 |
| 2001/0037615 | A1 * | 11/2001 | Riech | 52/79.1 |
| 2002/0148176 | A1 * | 10/2002 | Shelton | 52/169.1 |
| 2002/0184837 | A1 * | 12/2002 | Shelton | 52/167.1 |
| 2003/0126805 | A1 * | 7/2003 | Roberts | 52/80.1 |
| 2006/0169274 | A1 * | 8/2006 | Maier | 126/40 |
| 2006/0260214 | A1 * | 11/2006 | Tagg | 52/79.1 |
| 2007/0202796 | A1 * | 8/2007 | Kennedy et al. | 454/230 |
| 2008/0196329 | A1 * | 8/2008 | Kennedy et al. | 52/169.6 |

OTHER PUBLICATIONS

Derose, Dirk, "Low-Cost Redeployable Protective Shelter", U.S. Appl. No. 12/696,810, filed Jan. 29, 2012, Final Office Action dated Feb. 13, 2012.

Derose, Dirk, "Low-Cost Redeployable Protective Shelter", U.S. Appl. No. 12/696,810, filed Jan. 29, 2012, Non Final Office Action dated Oct. 3, 2011.

* cited by examiner

LOW-COST REDEPLOYABLE PROTECTIVE SHELTER

PRIOR APPLICATION DATA

The present application is a continuation of U.S. patent application Ser. No. 12/696,810, filed on Jan. 29, 2010, entitled "LOW-COST REDEPLOYABLE PROTECTIVE SHELTER", which claims priority to U.S. Provisional Patent Application No. 61/148,688, filed Jan. 30, 2009, which are incorporated herein by reference in their entireties.

BACKGROUND OF THE INVENTION

1. Technical Field

The present invention relates in general to protective shelters, which can used, for example, as safe rooms, tornado shelters, etc.

2. Description of the Related Art

Every year in the United States and around the globe a number of people are killed or injured by wind producing storms, such as tornados and tropical cyclones. This is especially in the case in the United States (U.S.), which has endured the most tornadoes of any country, nearly four times more than estimated in all of Europe, excluding waterspouts. The United States averages about 1,200 confirmed tornadoes per year. Tornadoes have been reported in every state in the U.S. and also in every season. Moreover, the most powerful tornados in the world are produced in the U.S. According to the National Oceanic and Atmospheric Administration (NOAA) there were 1,158 confirmed tornadoes reported in the U.S. in 2009, with 21 confirmed fatalities. These storms produce winds that can damage or destroy vehicles, buildings, and other outside objects, turning loose debris into deadly flying projectiles. For this reason, taking shelter from such storms is critical.

SUMMARY OF THE INVENTION

While underground protective shelters are arguably safer than above-ground protective shelters in wind storms, underground protective shelters have numerous disadvantages. Construction costs of underground shelters are greater than those for above-ground shelters. Also, underground shelters are not portable. Moreover, some locations are unsuitable for installation of underground shelters because of a high underground water table, which could flood the underground shelter and pose a danger to any inhabitants of the shelter.

An alternative to underground protective shelters is above-ground shelters. The safest types of above-ground shelters are massive concrete and/or steel-girder buildings. However, such buildings are expensive and certainly not portable. Houses with wood frame construction are vulnerable to tornadoes due to their high wind resistance and low structural weight. Mobile homes are particularly susceptible to tornado and tropical cyclone destruction because of their high wind resistance, low structural strength, and light weight.

An ideal solution to the above problems would be to construct a protective shelter that is made of inexpensive, pre- or semi-fabricated materials, that is small and light enough to be portable but massive enough for its size to not to be blown away, or otherwise structurally compromised in very high winds, and that has a relatively low wind resistance. With regard to wind resistance of above-ground structures, curved surfaces would be expected to have lower wind resistance than planar surfaces. However, curved surfaces are typically not as easy to work with or manufacture as are planar surfaces.

In one embodiment, a protective shelter is presented. The protective shelter includes a substantially cylindrical wall member defining a shelter interior. The wall member has a first end and a second end and an opening formed there through. A domed member is coupled to the first end of the wall member. A door coupled to the wall member. The door is openable to permit ingress and egress into and out of the shelter interior through the opening and being closeable to cover the opening. At least one anchor point is coupled to the wall member adjacent to the second end, such that the protective shelter can be anchored to an underlying substrate.

According to one aspect of the above embodiment, the wall member, the domed member, and the door are made from at least one pressure vessel, such as a decommissioned liquid propane (LP) tank. According to another aspect of the above embodiment, each dimension of the door exceeds a corresponding dimension of the opening, such that a perimeter of the door overlaps the wall member along an entire perimeter of the opening. According to another aspect of the above embodiment, the underlying substrate is earth and the at least one anchor point is configured for anchoring the protective shelter to the earth. According to an alternative aspect of the above embodiment, the underlying substrate is a concrete substrate and the at least one anchor point is configured for anchoring the protective shelter to the concrete substrate.

According to another embodiment, a method of installing a protective shelter is presented. The method includes placing the protective shelter on an installation site. The protected shelter has a shelter interior and includes a floor having a hole formed there through. An anchor is installed through the floor of the protective shelter and fastened in the shelter interior.

According to yet another embodiment, a method of constructing a protective shelter is presented. The method includes receiving a pressure vessel having a substantially cylindrical wall member coupled between a first domed end member and a second domed end member. The second domed end member is removed. An opening in the wall member of the pressure vessel is formed. The door is attached to the wall member to cover the opening.

DETAILED DESCRIPTION OF ILLUSTRATIVE EMBODIMENT

Figure 1:
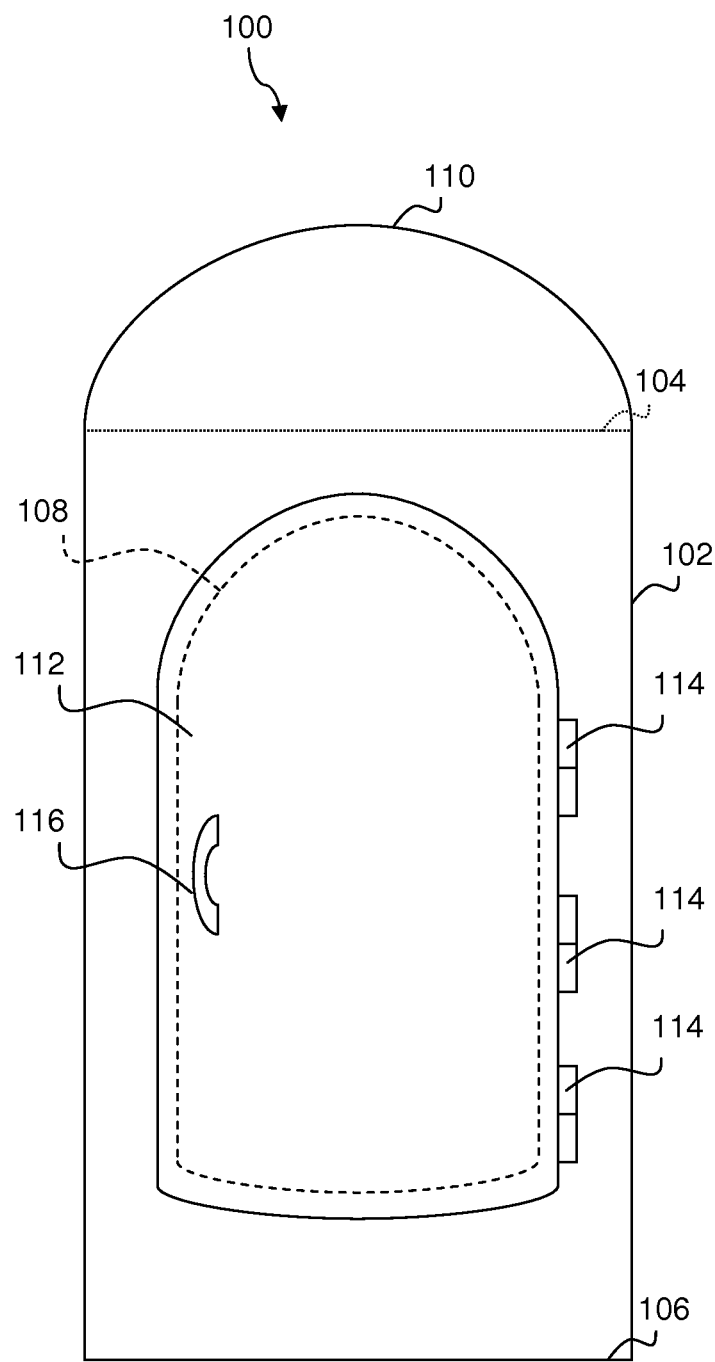
FIG. 1 illustrates a front elevation view of an exemplary protective shelter in accordance with the present invention.

With reference now to the figures, and in particular with reference to FIG. 1, there is depicted an exemplary embodiment of a protective shelter 100. As shown, protective shelter 100 includes a substantially cylindrical wall member 102 defining a shelter interior (shown subsequently as 204 in FIGS. 2 and 304 in FIGS. 3A and 3B). Wall member 102 includes a first end (illustrated as dotted line 104), a second end 106, and an opening (its perimeter is represented as dashed line 108) formed there through. A domed member 110 is coupled to first end 104 of wall member 102. A door 112 is coupled via hinges 114 to wall member 102. Door 112 is openable to permit ingress and egress into and out of shelter interior through opening 108 and closeable to cover opening 108 (as shown in FIG. 1). A handle 116 is attached to exterior of door 112 to facilitate opening of door 112 from the exterior of protective shelter 100. Each dimension of door 112 exceeds a corresponding dimension of the underlying opening 108, such that the perimeter of door 112 overlaps wall member 102 along an entire perimeter of opening 108. This overlay of door 112 over opening 108 provides a ventilation area in the form of a metered gap around the perimeter of door 112, whereby air flows to equalize atmospheric pressures, as well as to provide breathing air for the shelter's occupants. There is no line-of-sight in the ventilation area. The size and placement of the ventilation area is in keeping with National Storm Shelter Association (NSSA) standards for above-ground shelters.

According to one embodiment of the invention, wall member 102, domed member 110, and door 112 are made of rolled plate steel. In other embodiments, wall member 102 and door 112 are made out of spiral-welded piping. The thickness of wall member 102, domed member 110, and door 112 can vary. According to some embodiments, this thickness generally is between a quarter-inch and three-eighths inch. Moreover, wall member 102, domed member 110, and door 112 are configured to withstand debris impact testing associated with 250 mile-per-hour winds, as required by NSSA standard 2003, as well as meeting Federal Emergency Management Agency (FEMA) (e.g., FEMA Second Ed.) and the American Society of Civil Engineers (ASCE) (e.g., ASCE 7-2005) standards.

Figure 2:
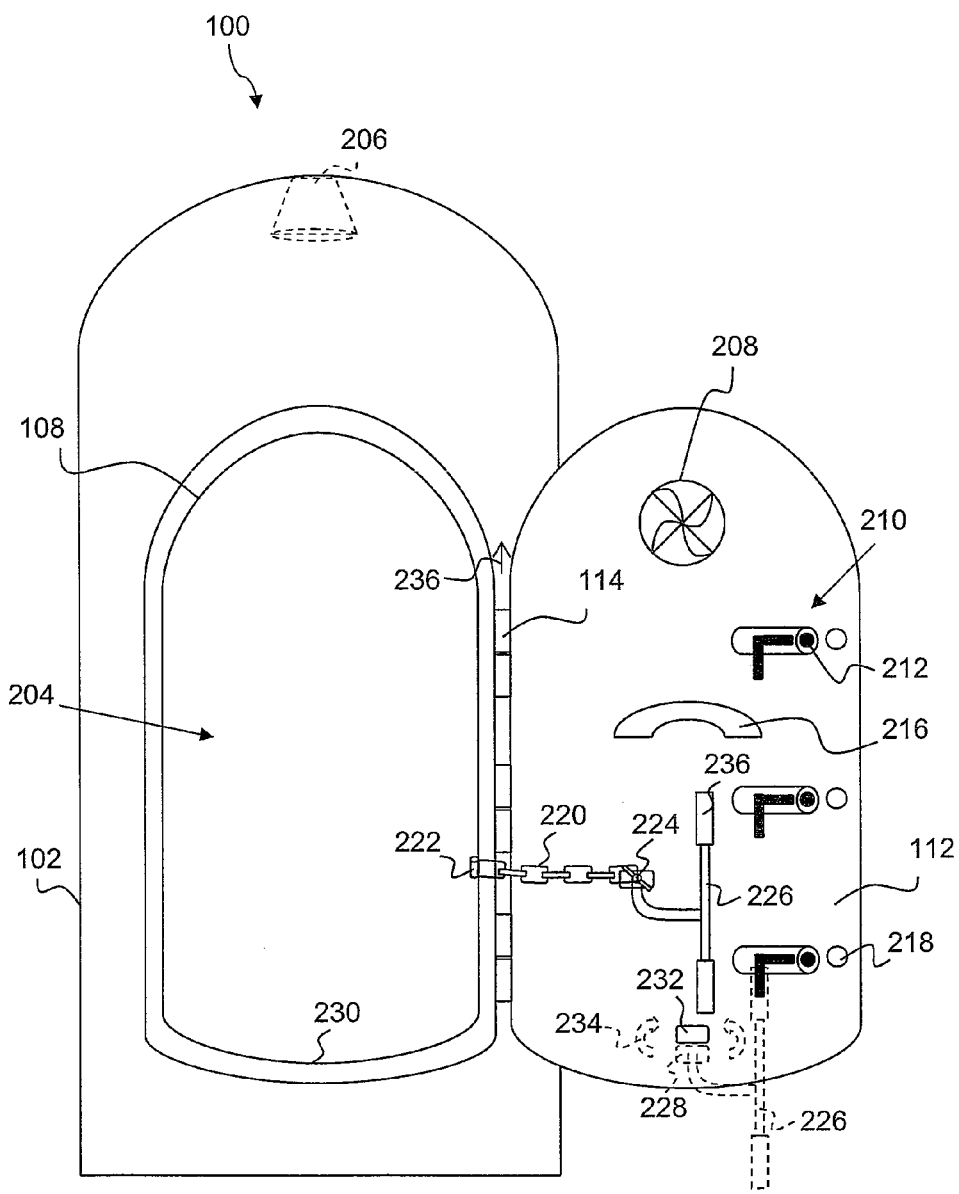
FIG. 2 illustrates the protective shelter in an open door configuration.

With reference now to FIG. 2, there is illustrated protective shelter 100 having door 112 in an open configuration, thus exposing interior 204 via opening 108 and interior portion of door 112. Interior 204 of shelter 100 is large enough to accommodate a typical family of three. However this is not limiting of the invention. Any number of occupants may be accommodated depending upon the size of the occupants and the interior size of shelter 100. Moreover, interior 204 may include an optional lamp 206 to illuminate interior 204. The interior of door 112 includes a fan 208 for providing additional ventilation to shelter occupants. Door 112 can be quickly and securely locked from interior 204 of shelter 100 using three lock assemblies 210. Although other embodiments are contemplated, in the illustrated embodiment, each lock assembly 210 includes a lockbolt 212 that extends to interior surface of wall member 102, when door 112 is in a closed configuration (thus, preventing door 112 from opening outwards from its closed configuration). An interior handle 216 is attached to interior of door 112 to facilitate closing and opening of door 112 from interior 204. In addition, door bumpers 218 are attached to interior of door 112 to protect wall member 102 from damage upon contact with door 112. A chain 220 is attached at one end to chain attachment bolt 222 at wall member 102 and at an opposite end to butterfly nut 224. Butterfly nut 224 also secures an unhinging tool 226, which, when unsecured from nut 224, is used to unhinge door 112 from interior 204 of shelter 100. To open door 112 from its hinges 114 when door 112 is initially in a closed configuration, a head 228 of unhinging tool 226 is placed between a gap formed between a bottom surface of protruding tab 232 that is coupled to door 112 and the top surface 230 at the bottom of opening 108. According to one embodiment, a shelter occupant can grab unhinging tool 226 by its handles 236 and then apply rotational force (illustrated by clockwise or counter-clockwise arrows 234) to unhinging tool 226, such that the rotational force 234 applied at head 228 pressures tab 232 and top surface 230 which results in an upward movement 236 of door 112.

Figure 3A:
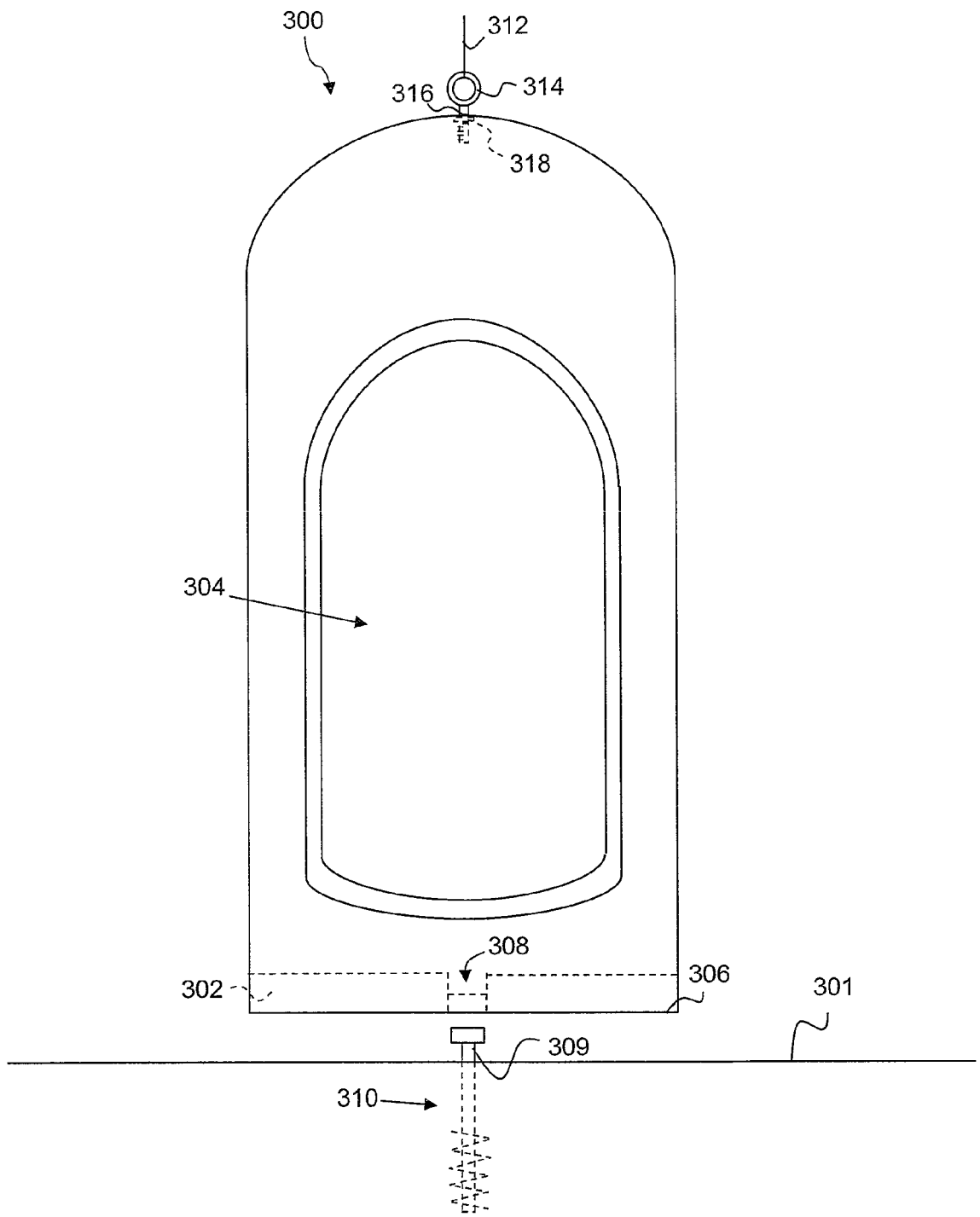
FIGS. 3A and 3B illustrate the exemplary protective shelter as configured for anchoring to earth in accordance with the present invention.

With reference now to FIGS. 3A, there is illustrated protective shelter 300 as it is configured for anchoring to an earth substrate 301 in accordance with one embodiment of the present invention. In preparation for a direct earth installation, a floor structure 302 is constructed and attached adjacent to end 306 of shelter 300. According to one embodiment, floor structure 302 is constructed from a combination of structural steel encased in a concrete slab and attached substantially adjacent to end 306. A hole 308 is formed through floor structure 302 to allow an upper end 309 of earth anchor 310 to be fastened to interior 304 of shelter 300. Earth anchor 310 is embedded securely into earth substrate 301. Shelter 300 is deployed onto the lawn or ground of the earth installation site using a boom truck crane (not shown) or similar lifting equipment. A crane cable 312 may be secured, for example, to a bolted loop 314 that extends through a dome hole 316. Bolted loop 314 is secured to interior 304 using a heavy nut 318. Shelter 300 is lowered onto earth substrate 301 such that upper end 309 of earth anchor 310 extends through hole 308 of floor structure 302.

Figure 3B:
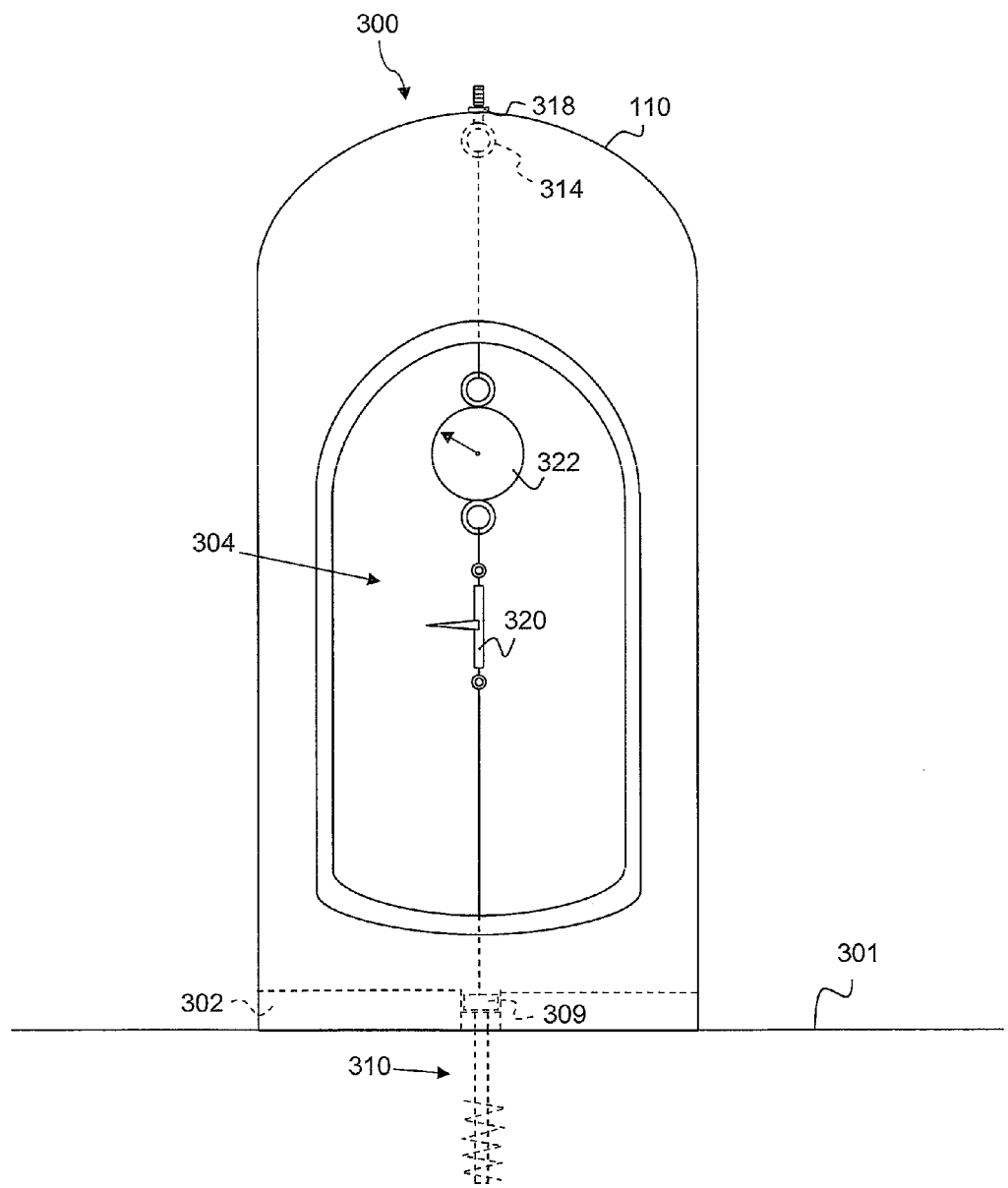

With reference now to FIG. 3B, there is illustrated protective shelter 300 undergoing a resistance test for securing shelter 300 to earth substrate 301 in accordance with one embodiment of the present invention. A tensioning apparatus 320 (e.g., a "come along" cable winch) is attached to earth anchor 310 below and an in-line crane scale 322, which in turn is attached to bolted loop 314 that is inverted from its configuration shown in FIG. 3B. Bolted loop 314 is secured to domed member 110 using heavy nut 318. After tensioning apparatus applies a first predetermined tension as indicated by scale 322, if the measured tension drops from the first predetermined tension, additional tension is applied until the measured tension stops decreasing more than a selected tension during a predetermined waiting period, which indicates that shelter 300 is fully settled in the ground and earth anchor is secure within earth substrate 301. Once it is determined that the measured tension does not decrease more than the selected amount, the tension is decreased to a second predetermined tension, and upper end 309 of earth anchor 310 is secured to floor structure 302 in shelter interior 304.

Figure 4A:
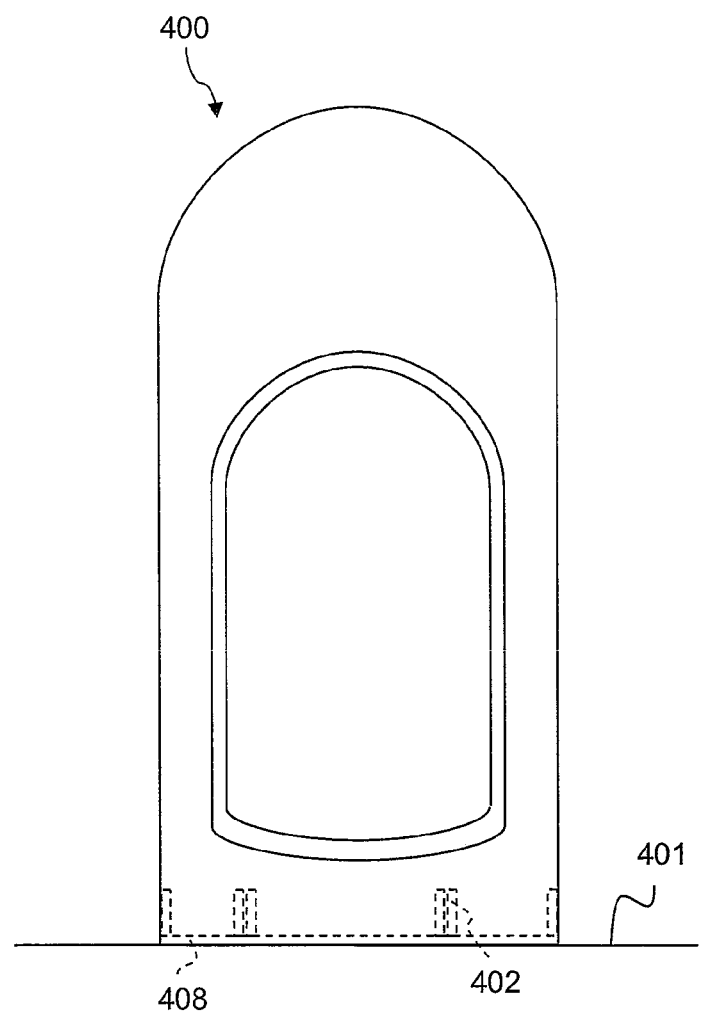
FIG. 4A illustrates the exemplary protective shelter as configured for anchoring to a concrete substrate.
Figure 4B:
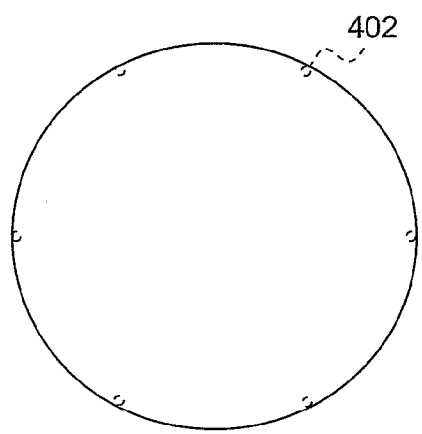
FIG. 4B illustrates a top view of a plurality of anchor points coupled to the exemplary protective shelter shown in FIG. 4A.

With reference now to FIG. 4A, there is illustrated protective shelter 400 as it is configured for anchoring to a concrete substrate 401 in accordance with one embodiment of the present invention. In preparation for a concrete installation, a plurality of anchor points 402 is attached (e.g., welded) to an interior 404 of wall member 102. Anchor points 402 are positioned equidistantly, as shown in FIG. 4B in accordance with one embodiment of the present invention. The number of anchor points may vary in accordance with the size and weight of shelter 400, as well as the strength of the underlying concrete substrate 401. An anti-fatigue mat 408 having an equal or larger perimeter dimension than the circumference of end 406 is positioned atop of the installation area of shelter 400. Shelter 400 is secured to concrete substrate 401 by driving an anchor bolt through each anchor point 402 and underlying mat 408. With regard to the embodiments illustrated in FIGS. 3A, 3B, 4A, and 4B, it should be noted that the protective shelter in its unassembled state can be easily transported over highways in a medium-sized truck. Moreover, the protective shelter, after having been used at one location, can be detached at or from its anchor point and transported elsewhere, and reassembled at the new location.

Figure 5:
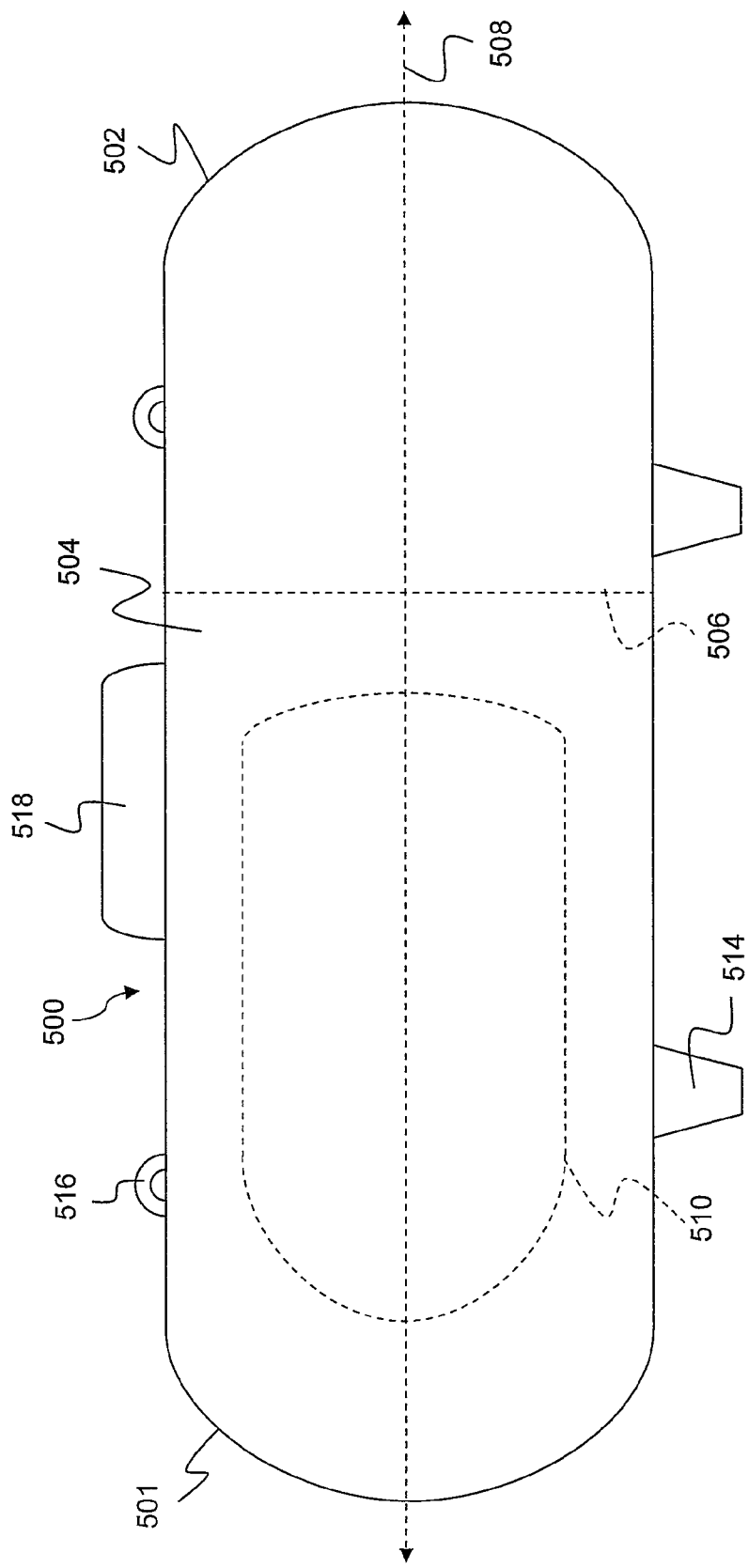
FIG. 5 illustrates a front elevation view of an exemplary pressure vessel used to construct the protective shelter in accordance with the present invention.

In an effort to construct a protective shelter that is inexpensive, environmentally friendly, and can withstand the pressure, wind, and debris impact associated with a tornado or tropical cyclone, the protective shelter can be constructed using recycled pressure vessels. According to one embodiment of the present invention, such a pressure vessel is a decommissioned liquid propane (LP) tank 500 as shown in FIG. 5. Tank 500 includes a substantially cylindrical wall member 504 coupled between first and second domed end members 501 and 502. To construct the cylindrical member 102 and domed member 110 of exemplary shelter 100, second domed end member 502 is removed along dotted circumference 506, such that the shelter manufacturer cuts around a circumference of wall member 504 orthogonally to a longitudinal axis 508 of wall member 504. An opening 510 equivalent in dimension to opening 108 of FIG. 1 is formed as outlined by dotted line 512. The door that overlays opening 508 is formed from the wall member 504 of a second tank (not shown). Moreover, in further preparation of tank 500, the tank's feet 514, pipes 516, valves 518, and other parts that would create added wind resistance may also be removed. The tank's interior and exterior surfaces are cleaned and repaired where needed. While a standard 499-gallon LP tank can typically accommodate a family of three, it should be understood that other vessel sizes may be employed to accommodate a varying quantity and physical size of occupants.

Figure 6:
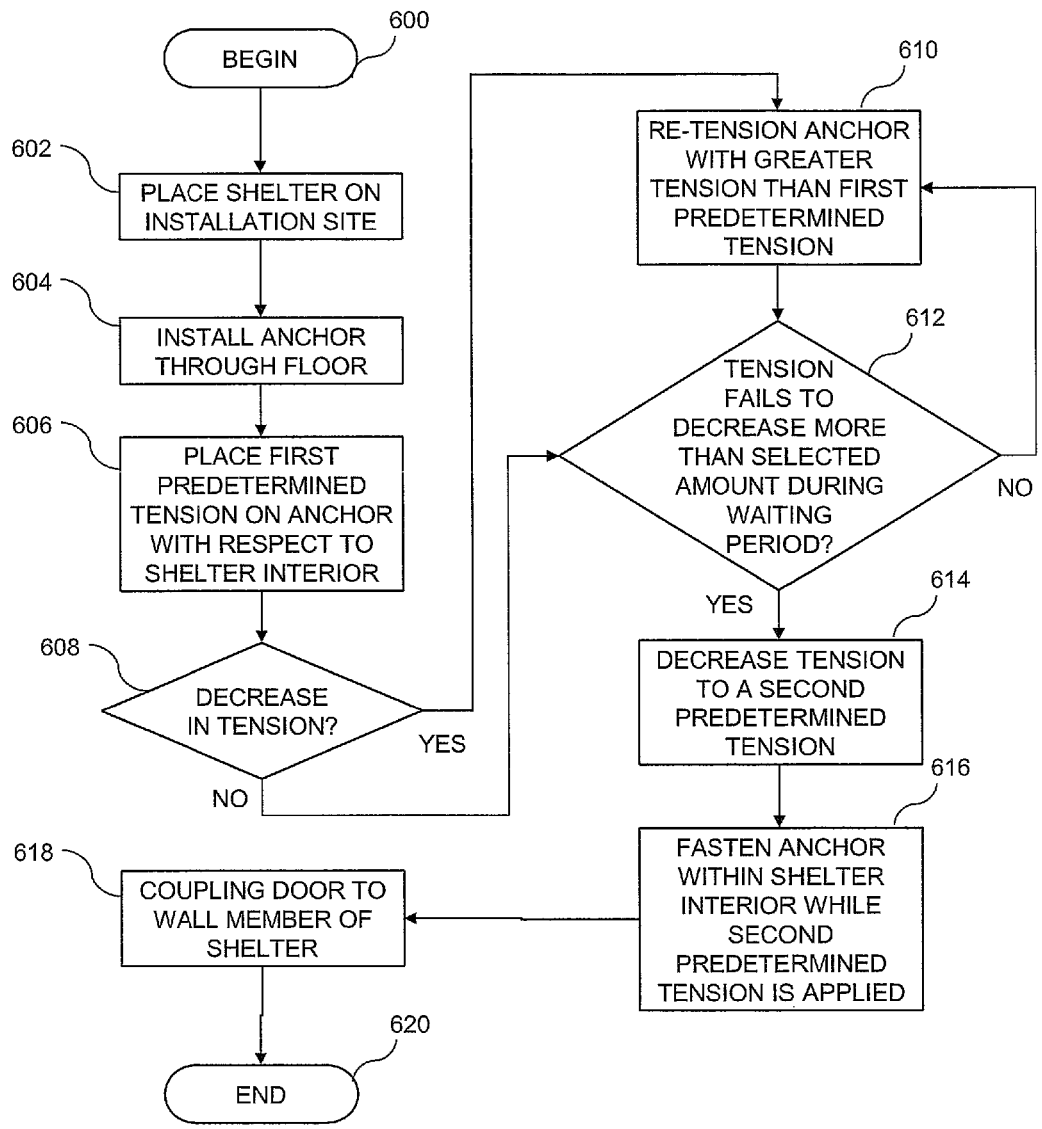
FIG. 6 is a high level logical flowchart of an exemplary method of installing a protective shelter in accordance with the present invention.

With reference now to FIG. 6, there is illustrated a high level logical flowchart of an exemplary method of installing a protective shelter 300 in accordance with the present invention. As illustrated, the process begins at block 600 and then proceeds to block 602, which depicts an installer placing protective shelter 300, 400 on an installation site. As discussed above, protective shelter 300, 400 has a shelter interior 304, 404 and includes a floor 302 having a hole 308 formed there through. An anchor 310 is installed through floor 302 of protective shelter 300, as indicated in block 604. To test the resistance of the protective shelter to overturning and/or movement, tensioning apparatus 320 places a first predetermined tension on anchor 310 with respect to shelter interior 304, as depicted in block 606.

At decision block 608, a determination is made whether a decrease in tension of more than a selected amount has occurred after placing the first predetermined tension on anchor 310. If not, the method continues to decision block 612. However, if it is determined that a decrease in tension has occurred, tensioning apparatus 320 is utilized to re-tension anchor 310 with a tension that is greater than the first predetermined tension, as depicted in block 610. From block 610, the method continues to decision block 612. If the measured tension decreases more than the selected amount during a waiting period, further re-tensioning occurs (block 610). If the measured tension does not decrease more than the selected amount within the waiting period, the tension is decreased to a second predetermined tension (block 614), and anchor 310 is fastened within shelter interior 304 (e.g., with a lock nut) while the second predetermined tension is applied (block 616). From block 616, the method proceeds to block 618, which depicts door 112 being coupled to wall member 102 of shelter 100, 200, 300, 400. Following block 618, the method ends at block 620.

Figure 7:
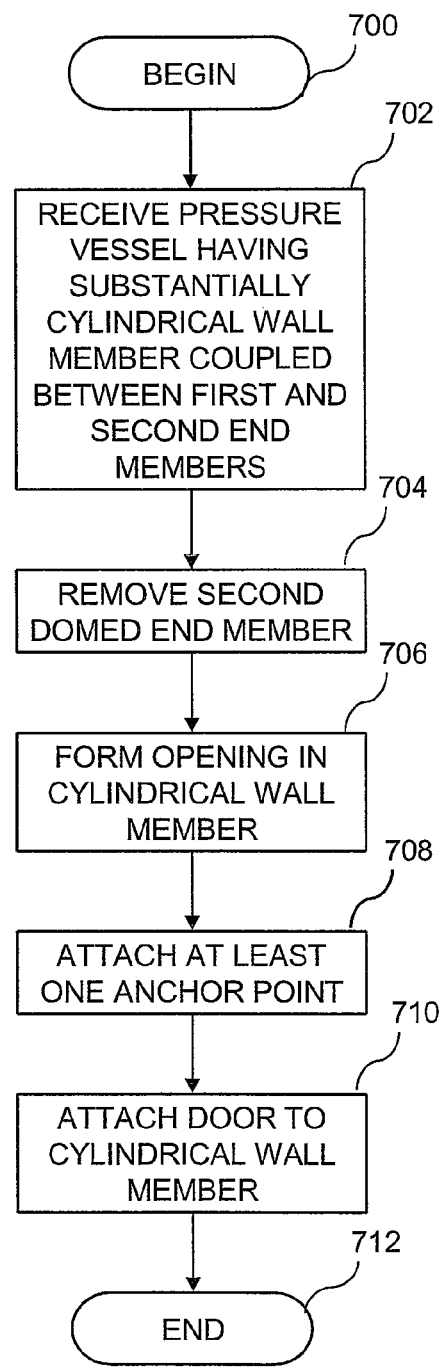
FIG. 7 is a high level logical flowchart of an exemplary method of constructing the protective shelter in accordance with the present invention.

With reference now to FIG. 7, there is illustrated a high level logical flowchart of an exemplary method of constructing a protective shelter in accordance with the present invention. As illustrated, the process begins at block 700 and then proceeds to block 702, which depicts receiving a pressure vessel. According to one embodiment, the pressure vessel is a liquid propane (LP) tank 500, which may have formerly been used to hold LP. Pressure vessel 500 has a substantially cylindrical wall member 504 coupled between a first domed end member 501 and a second domed end member 502. Second domed end member 502 is removed, as depicted in block 704. An opening 510 is formed in cylindrical wall member 504 (block 706). Moreover, at least one anchor point 308, 402 is attached to cylindrical wall member 504 (block 708). From block 708, the method continues to block 710, which depicts attaching a door 112 to wall member 504 to cover the formed opening 510. Following block 710, the method ends at block 712. As will be appreciated, the method may optionally include additional steps of cleaning and/or painting the interior and/or exterior of the pressure vessel.

All of the apparatus and methods disclosed and claimed herein can be made and executed without undue experimentation in light of the present disclosure. While the invention has been described in terms of various embodiments, it will be appreciated by those skilled in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined. Accordingly, the particular arrangements disclosed are meant to be illustrative only and not limiting as to the scope of the invention which is to be given the full breadth of the appended claims and any and all equivalents thereof.

What is claimed is:

1. A method of providing a protective shelter, the method comprising:
   receiving a pressure vessel having a substantially cylindrical wall member coupled between first and second domed end members, wherein the substantially cylindrical wall member has a central axis substantially equidistant from points on the substantially cylindrical wall member;
   removing the second domed end member along a plane substantially orthogonal to the central axis;
   forming an opening in the wall member of the pressure vessel; and
   attaching a door by at least one hinge to the wall member to cover the opening, wherein the wall member and first domed member define a shelter interior sized to accommodate one or more people.

2. The method of claim 1, wherein the pressure vessel is a decommissioned liquid propane (LP) tank.

3. The method of claim 1, the method further comprising attaching at least one anchor point to the protective shelter.

4. The method of claim 3, wherein attaching at least one anchor point includes attaching at least one anchor point within the shelter interior.

5. The method of claim 3, and further comprising:
placing the protective shelter at an installation site with the central axis substantially orthogonal to an earth's surface; and
attaching the at least one anchor point to an underlying substrate at the installation site.

6. The method of claim 5, wherein the underlying substrate is earth.

7. The method of claim 5, wherein the underlying substrate is concrete.

8. The method of claim 5, wherein the placing includes placing the protective shelter such that the wall member and first domed end member are entirely above the earth's surface at the installation site.

9. The method of claim 1, the method further comprising attaching a floor adjacent to an end of the wall member opposite the first domed end member, wherein the floor is substantially orthogonal to the central axis.

10. The method of claim 9, and further comprising:
placing the protective shelter at an installation site with the central axis substantially orthogonal to an earth's surface; and
attaching the protective shelter to an underlying substrate at the installation site.

11. The method of claim 10, wherein the placing includes placing the protective shelter such that the wall member and first domed end member are entirely above the earth's surface at the installation site.

12. The method of claim 9, wherein the floor comprises a concrete slab.

13. The method of claim 12, wherein the concrete slab forms a portion of the underlying substrate.

14. The method of claim 1, wherein;
each dimension of the door exceeds a corresponding dimension of the opening; and
attaching comprises attaching the door such that a perimeter of the door overlaps the wall member along an entire perimeter of the opening.

15. The method of claim 1, wherein attaching the door by at least one hinge to the wall member to cover the opening comprises attaching the door by at least one hinge rotatable about an axis parallel with the central axis.

16. The method of claim 1, further comprising installing a fan within the shelter interior.

17. The method of claim 1, further comprising installing a lamp within the shelter interior.

18. The method of claim 1, wherein receiving a pressure vessel includes receiving a steel pressure vessel.

19. The method of claim 1, and further comprising installing a locking assembly within the shelter interior that locks the door in a closed position in which the door covers the opening.

20. The method of claim 1, and further comprising attaching a lifting attachment point to an exterior of the first domed end member.

21. The method of claim 1, wherein:
the wall member includes an interior surface and an exterior surface;
the attaching includes attaching the door by at least one hinge to the exterior surface of the wall member; and
the method further comprises removably coupling an unhinging tool to an interior surface of the protective shelter, wherein the unhinging tool is configured to unhinge the door from within the shelter interior when the door is in a closed position in which the door covers the opening.

* * * * *